United States Patent
Dixon et al.

(10) Patent No.: US 9,912,545 B2
(45) Date of Patent: Mar. 6, 2018

(54) HIGH PERFORMANCE TOPOLOGY RESOLUTION FOR NON-INSTRUMENTED NODES

(71) Applicant: International Business Machines Corporation, Armonk, NY (US)

(72) Inventors: Scot W. Dixon, Manning (AU); Steven Larcombe, Victoria Park (AU); Mark N. Weatherill, Victoria Park (AU)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 14/663,893

(22) Filed: Mar. 20, 2015

(65) Prior Publication Data
US 2016/0277252 A1 Sep. 22, 2016

(51) Int. Cl.
*H04L 12/24* (2006.01)
*H04L 29/08* (2006.01)
*H04L 12/26* (2006.01)
*H04L 12/751* (2013.01)
*G06F 11/30* (2006.01)

(52) U.S. Cl.
CPC ............ *H04L 41/12* (2013.01); *H04L 43/04* (2013.01); *H04L 67/10* (2013.01); *H04L 67/22* (2013.01); *G06F 11/3048* (2013.01); *H04L 45/02* (2013.01)

(58) Field of Classification Search
CPC .................................................. H04L 41/12
See application file for complete search history.

(56) References Cited

U.S. PATENT DOCUMENTS

| | | | | |
|---|---|---|---|---|
| 7,035,852 B2* | 4/2006 | Hopewell | ............... | G06F 9/546 |
| 7,039,671 B2* | 5/2006 | Cullen | .................... | H04L 29/06 |
| | | | | 709/201 |
| 7,395,195 B2* | 7/2008 | Suenbuel | ............... | H04L 29/06 |
| | | | | 700/31 |

(Continued)

OTHER PUBLICATIONS

Larcombe, Steve, "ITAM for Transactions 7.3: Introduction to Agentless Tracking", developer Works®, Jul. 22, 2011, <https://www.ibm.com/developerworks/community/blogs/0587adbc-8477-431f-8c68-9226adea11ed/entry/itcam_for_transactions_7_3_introduction_to_agentless_tracking49?lang=en>.

(Continued)

*Primary Examiner* — Jimmy H Tran
(74) *Attorney, Agent, or Firm* — Gilbert Harmon, Jr.

(57) ABSTRACT

A method for processing data includes performing an extract-transform-load operation on a set of application activity data to provide a topology index comprising a plurality of unique entries, extracting node information and connection information for an application data structure and building a data structure corresponding to the application therefrom, and providing information from the application topology data structure to a user. A computer program product corresponding to the method is also disclosed herein. Also disclosed is an apparatus for processing data comprising a processing module configured to perform an extract-transform-load operation on application activity data, an extraction module configured to extract node and connection information for the application, and a topology calculator configured to build a topology data structure corresponding to the application. The apparatus may additionally include a persistent data store configured to store the topology index.

20 Claims, 7 Drawing Sheets

(56) References Cited

U.S. PATENT DOCUMENTS

| | | | | |
|---|---|---|---|---|
| 7,454,478 B1* | 11/2008 | Rosselli | ............ | G06Q 30/02 |
| | | | | 709/214 |
| 7,562,365 B2* | 7/2009 | Dinh | ............ | H04L 51/26 |
| | | | | 719/314 |
| 7,716,652 B2* | 5/2010 | Smith | ............ | G06F 11/3668 |
| | | | | 717/128 |
| 7,930,396 B2* | 4/2011 | Trinon | ............ | G06Q 10/06 |
| | | | | 705/348 |
| 7,996,513 B2 | 8/2011 | Gorman et al. | | |
| 8,683,489 B2* | 3/2014 | Dixon | ............ | G06F 9/546 |
| | | | | 719/314 |
| 8,725,888 B2* | 5/2014 | Short | ............ | H04L 63/08 |
| | | | | 709/219 |
| 9,167,618 B2* | 10/2015 | Brisebois | ............ | H04W 76/046 |
| 9,424,119 B2 | 8/2016 | Ercegovac et al. | | |
| 9,455,888 B2* | 9/2016 | Dixon | ............ | H04L 67/025 |
| 9,459,942 B2* | 10/2016 | Dagan | ............ | G06F 11/0712 |
| 9,549,030 B2* | 1/2017 | Malloy | ............ | H04L 67/22 |
| 2003/0058277 A1* | 3/2003 | Bowman-Amuah | | |
| | | | ............ | G06F 17/30607 |
| | | | | 715/765 |
| 2004/0220947 A1 | 11/2004 | Aman et al. | | |
| 2004/0240458 A1* | 12/2004 | T V | ............ | H04L 67/1002 |
| | | | | 370/412 |
| 2006/0092861 A1* | 5/2006 | Corday | ............ | H04L 41/0213 |
| | | | | 370/256 |
| 2007/0130255 A1* | 6/2007 | Wolovitz | ............ | H04L 51/38 |
| | | | | 709/204 |
| 2007/0143795 A1* | 6/2007 | Tran | ............ | G06F 11/3636 |
| | | | | 725/46 |
| 2009/0070780 A1* | 3/2009 | Dinh | ............ | G06F 9/546 |
| | | | | 719/314 |
| 2009/0164270 A1* | 6/2009 | Seidman | ............ | G06Q 10/0639 |
| | | | | 705/7.38 |
| 2009/0187579 A1* | 7/2009 | Brancaccio | ............ | G06F 17/30545 |
| 2010/0241732 A1* | 9/2010 | del Valle Lopez | ............ | G06F 3/038 |
| | | | | 709/219 |
| 2011/0035724 A1* | 2/2011 | Kettley | ............ | G06F 8/75 |
| | | | | 717/106 |
| 2011/0099559 A1* | 4/2011 | Kache | ............ | G06F 9/5061 |
| | | | | 719/318 |
| 2011/0238861 A1* | 9/2011 | Hutchinson | ............ | G06F 9/54 |
| | | | | 709/238 |
| 2011/0295633 A1* | 12/2011 | Bird | ............ | G06F 17/30601 |
| | | | | 705/7.11 |
| 2012/0054331 A1* | 3/2012 | Dagan | ............ | G06F 11/0712 |
| | | | | 709/224 |
| 2013/0019008 A1* | 1/2013 | Jorgenson | ............ | H04L 41/12 |
| | | | | 709/224 |
| 2013/0070622 A1* | 3/2013 | Degioanni | ............ | H04L 67/1097 |
| | | | | 370/252 |
| 2013/0179446 A1* | 7/2013 | Dixon | ............ | G06F 11/3065 |
| | | | | 707/736 |
| 2013/0179448 A1* | 7/2013 | Dixon | ............ | G06F 11/3065 |
| | | | | 707/737 |
| 2013/0297556 A1* | 11/2013 | Chen | ............ | G06F 17/30 |
| | | | | 707/602 |
| 2016/0087860 A1* | 3/2016 | Dixon | ............ | H04L 67/025 |
| | | | | 370/252 |

OTHER PUBLICATIONS

Russell, David, "Best Practice to instrument transactions with Transaction Tracking API (TTAPI)", developer Works® wiki, Apr. 2, 2014, <https://www.ibm.com/developerworks/community/wikis/home?lang=en#!/wiki/Tivoli%20Composite%20Application%20Manager/page/Best%20practice%20to%20instrument%20transactions%20with%20Transaction%20Tracking%20API%20%28TTAPI%29>.

* cited by examiner

HIGH PERFORMANCE TOPOLOGY RESOLUTION FOR NON-INSTRUMENTED NODES

BACKGROUND OF THE INVENTION

The present invention relates generally to the field of data processing, and more particularly to constructing an application topology data structure in the presence of instrumented and non-instrumented nodes.

Transaction tracking technologies focus on tracking composite applications across multiple technologies, protocols, domains, and operating systems. Tracking is often achieved by instrumenting targeted software with tracking agents which generate tracking events at strategic points in an application flow. Collected tracking events can be analyzed to determine application metrics and topology.

One of the challenges for transaction tracking is topology building. Making the necessary associations between a request and a response from an application in one domain with the corresponding request and response in an adjacent domain can be difficult. This problem can be compounded when some domains are not instrumented. Non-instrumented nodes may be present in a scenario where data is traveling from an instrumented node to a secure server that cannot be instrumented and therefore does not provide any application monitoring information. In cases where domains are not instrumented, data from adjacent instrumented domains can be used to infer data about non-instrumented domains.

Consider a scenario where a very large number of domains are being monitored with a mix of instrumented and non-instrumented domains in a cloud-based environment. The tracking/monitoring data associated with the monitored domains is very large. The challenge is to process this data quickly and efficiently to produce performance metrics and application topologies.

SUMMARY

As disclosed herein, a method for processing data includes performing an extract-transform-load operation on a set of application activity data to provide a topology index comprising a plurality of unique entries, extracting node information and connection information for each entry in the topology index and building an application topology data structure therefrom, and providing information from the application topology data structure to a user. A computer program product corresponding to the method is also disclosed herein.

Also disclosed herein, an apparatus for processing data includes a processing module configured to perform an extract-transform-load operation on a set of application activity data, an extraction module configured to extract node information and connection information for each entry in the topology index, and a topology calculator configured to build a topology data structure corresponding to the application. The apparatus may also include a persistent data store. The method and the apparatus may be utilized to facilitate efficient analysis of an applications nodes and connections.

DETAILED DESCRIPTION

Figure 1:
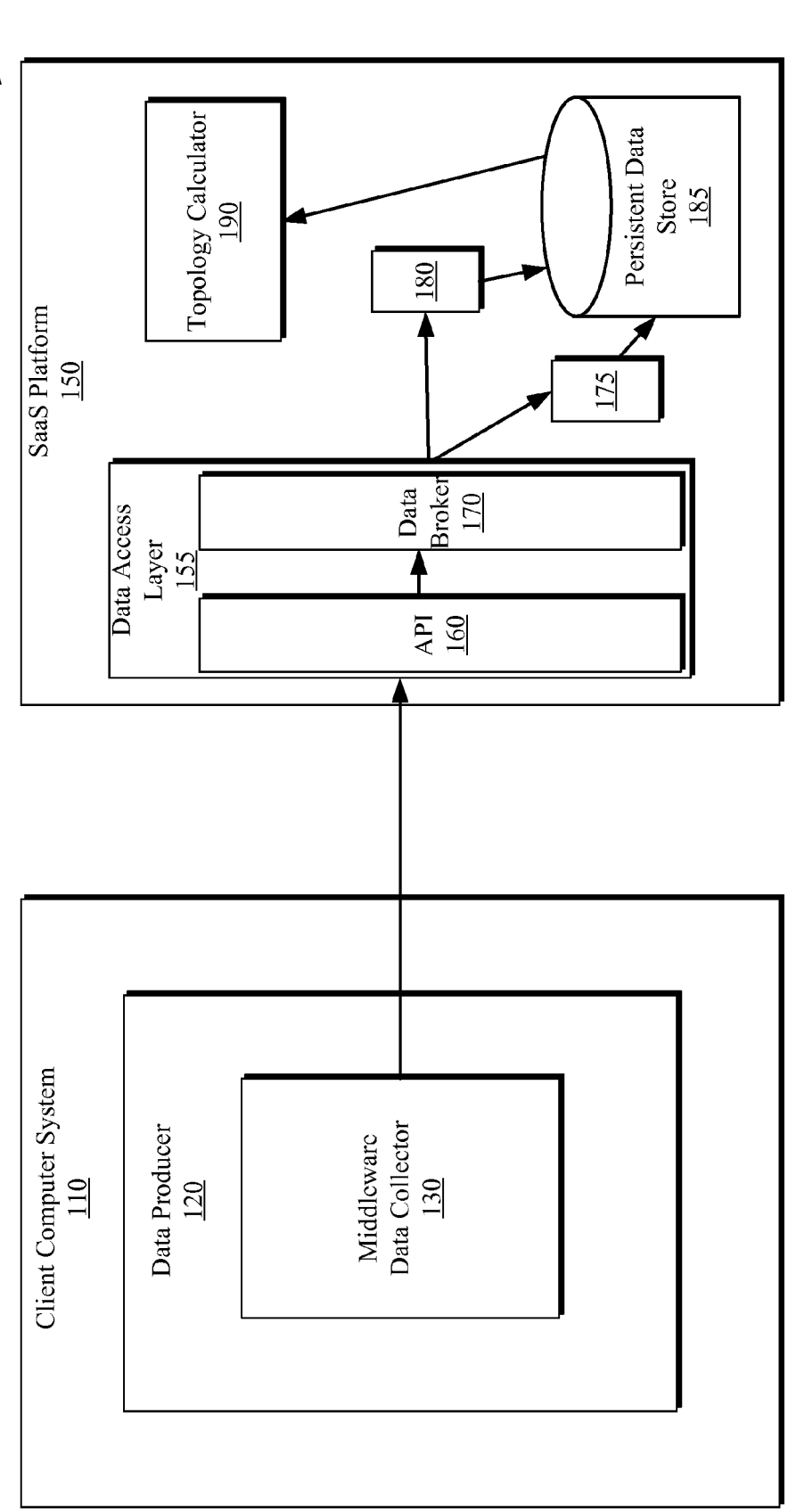
FIG. 1 is a functional block diagram illustrating a data processing environment, in accordance with an embodiment of the present invention.

FIG. 1 is a functional block diagram illustrating a data processing environment 100, in accordance with an embodiment of the present invention. As depicted, the data processing environment includes a client computer system 110, a data producer 120, a middleware data collector 130, a Software as a Service platform (SaaS) 150, a data access layer 155, an application programming interface (API) 160, a data broker 170, two processing modules 175 and 180, a persistent data store 185, and a topology calculator 190. The data processing environment depicts how data travels from the components of the client computer 110 to the components of the SaaS platform 150 to build a topology data structure corresponding to the application. Computing environment 100 may include additional computing devices, servers, computers, components, or other devices not present.

Client computer system 110 can be a desktop computer, a laptop computer, a specialized computer server, or any other computer system known in the art. In general, client computer system 110 is representative of any electronic device, or combination of electronic devices, capable of executing machine-readable program instructions, as described in greater detail with regard to FIG. 4.

Data producer 120 refers generally to the components of the client computer system 110 that are responsible for monitoring and retrieving application data. In the depicted embodiment, the data producer 120 comprises a middleware data collector 130. In other embodiments, the data producer 120 may comprise multiple applications responsible for monitoring and retrieving relevant application data. The output from the data producer 120 is sent to the Software as a Service platform 150 to be processed.

Middleware data collector 130 may be a software application configured to collect data related to an application. In one embodiment, the collected data may be tracking or monitoring data corresponding to a large number of instrumented and non-instrumented domains. The middleware data collector 130 collects this data to be sent to the Software as a Service platform 150 to be processed.

Software as a Service platform 150 (also called on-demand software) corresponds to software that is centrally hosted and may be available to a user via a subscription basis. The Software as a Service platform 150 may be available to the user using a thin client via a web browser. As depicted, the applications hosted by the Software as a Service platform 150 may include a data access layer 155, an application program interface (API) 160, a data broker 170, two processing modules 175 and 180, a persistent data store 185, and a topology calculator 190.

Data access layer 155 is the layer of the Software as a Service platform 150 that provides simplified access to data stored in persistent storage of some kind. As depicted, the data access layer 155 includes API 160 and data broker 170. The data access layer 155 makes data available to the other applications on the Software as a Service platform 150.

API 160 may be an application configured to provide an interface for data producers to send data to data broker 170. In one embodiment, API 160 implements a method for data producers to connect and send data to other modules or applications. API 160 may also be configured to implement a method for data to be transferred into data broker 170.

Data broker 170 (also called an information broker) may be a software application that accepts all the inbound data that has been collected and allows other software applications to subscribe and request the data from the collection that has already been conducted. In the depicted embodiment, the software applications requesting data from the data broker 170 may include the processing modules 175 and 180 and the persistent data store 185.

Processing modules 175 and 180 are data processing modules configured to conduct an extract-transform-load (ETL) operation on the data received via the data broker 170. Extract-transform-load is the process of accepting data from a source, transforming the data into a modified format, and then storing (or persisting) the data in the modified format. The processing modules may each be configured to perform a different transformation on the data, and there may be any number of processing modules in different embodiments of the data processing environment 100. For example, one processing module 180 may be configured to perform an ETL process specific to constructing the application topology data structure as addressed by the present invention. The ETL process may build a data table corresponding to the extracted data, and from the data table a topology index may be created that contains a unique row of data for each node in an application topology. Processing module 180 may be configured to carry out the extract-transform-load operation as described in operational step 210 of FIG. 2.

Persistent data store 185 may be configured to store incoming application monitoring records in persistent storage and index the data to optimize queries from consumers. Persistent data store 185 may be a document store or a relational database. The data stored in persistent data store 185 may be the application monitoring data received from the data broker 170. The data stored in persistent data store 185 may also be the topology index produced by the processing module 180.

Topology calculator 190 is an application configured to query the persistent data store 185 to retrieve and process the topology index produced by the processing module 180 and stored in the persistent data store 185. Topology calculator 190 utilizes an algorithm to build the topology data structure efficiently by processing the set of light-weight documents in the topology index as opposed to the entire set of application monitoring data. In the depicted embodiment, the topology calculator 190 may also serve as an extraction module configured to extract node information and connection information for each entry in the topology index.

Figure 2:
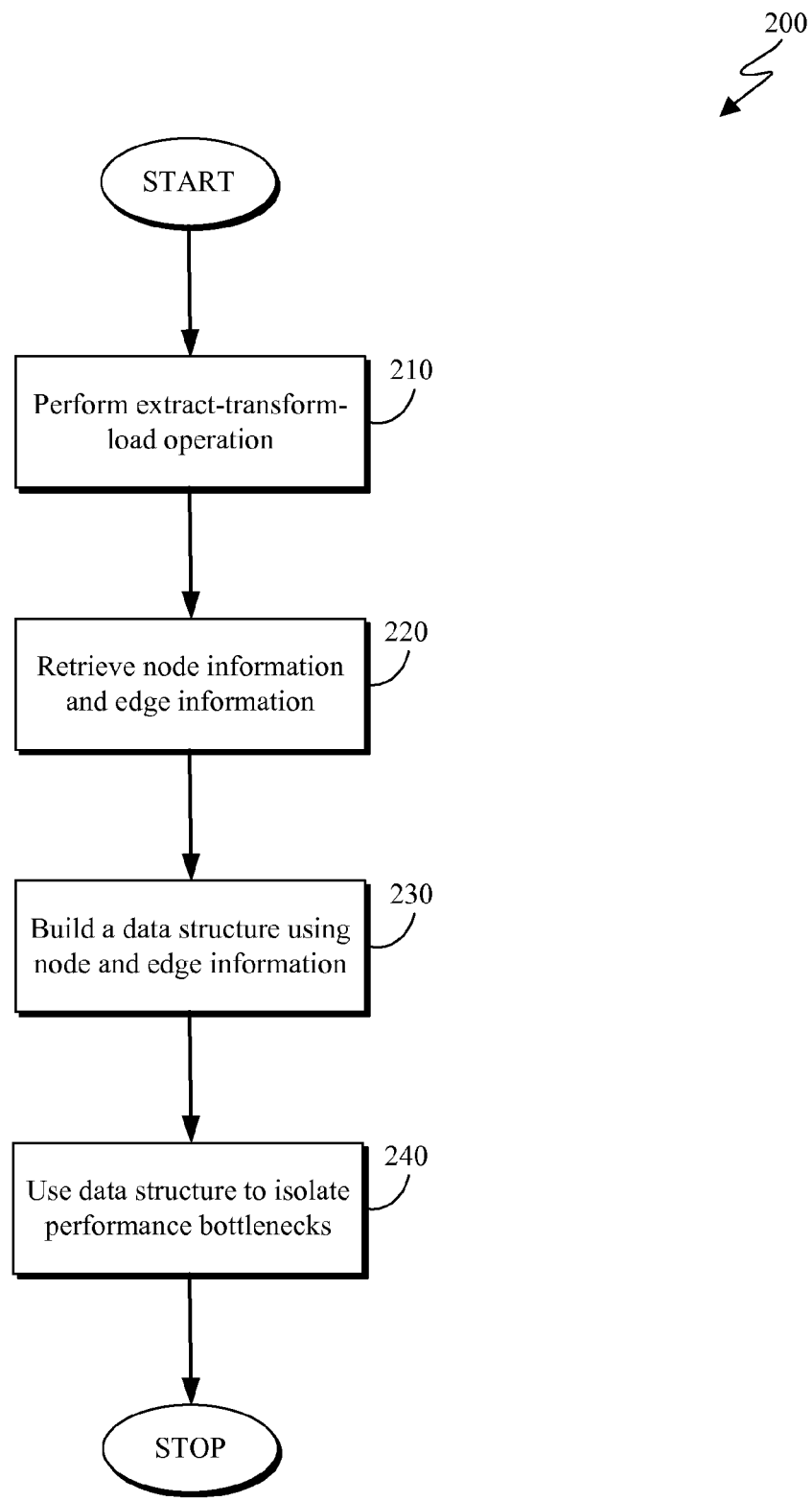
FIG. 2 is a flowchart depicting operational steps of a method for constructing an application topology data structure in accordance with an embodiment of the present invention.

FIG. 2 is a flowchart depicting operational steps of an application topology data structure construction method 200 in accordance with an embodiment of the present invention. As depicted, the application topology data structure construction method 200 includes performing (210) an extract-transform-load operation on a set of application activity data, extracting (220) node information and connection information for an application topology data structure, building (230) a topology data structure corresponding to the application, and providing (240) information from the application topology data structure to a user. The application topology data structure construction method 200 provides increased efficiency in constructing application topology data structures, and consequentially allows for improved performance bottleneck detection.

Performing (210) an extract-transform-load (ETL) operation on a set of application activity data may include processing a set of application activity data to provide a topology index comprising a plurality of unique entries. Each entry of the plurality of unique entries may correspond to two nodes and a connection in an application topology data structure. The ETL operation may include processing the subset of application monitoring data that is related to adjacent nodes, also called horizontal data, and extracting vertical and horizontal context data. Each unique combination of vertical and horizontal data represents two interrelated nodes as well as the activity direction between them (i.e. whether data is inbound or outbound from the instrumented node). The unique combinations may be hashed to eliminate redundant entries and stored as light-weight documents with no duplicates. The created set of data corresponds to all instrumented to non-instrumented nodes and corresponding connections, but is much smaller than the complete set of application monitoring data. The set of light-weight documents may essentially provide a topology index.

Extracting node information and connection information (220) for an application topology data structure may include processing the topology index produced by the ETL operation (210) to provide a comprehensive set of nodes and connections between nodes. Since each unique entry in the topology index corresponds to two nodes and the activity direction between them, processing the entire topology index captures all the nodes and connections in an application topology.

Building a topology data structure (230) corresponding to the application may include using the extracted node information and connection information to construct a topology data structure reflecting the application activity. In different embodiments, the topology data structure could be a graph or a topology corresponding to the node and connection information. A module such as the topology calculator 190 in FIG. 1 may be configured to build the topology data structure corresponding to the application.

Providing information from the application topology data structure to a user (240) may include displaying the topology data structure to a user so that the user may analyze the depicted transaction path(s). The user may identify performance bottlenecks as revealed by the topology data structure. In one embodiment, the information from the application topology data structure may be provided to a software application for analysis. In some embodiments, a response time value may be associated with each node, and this response time information may be evaluated by a user to identify any performance issues associated with the nodes.

Figure 3:
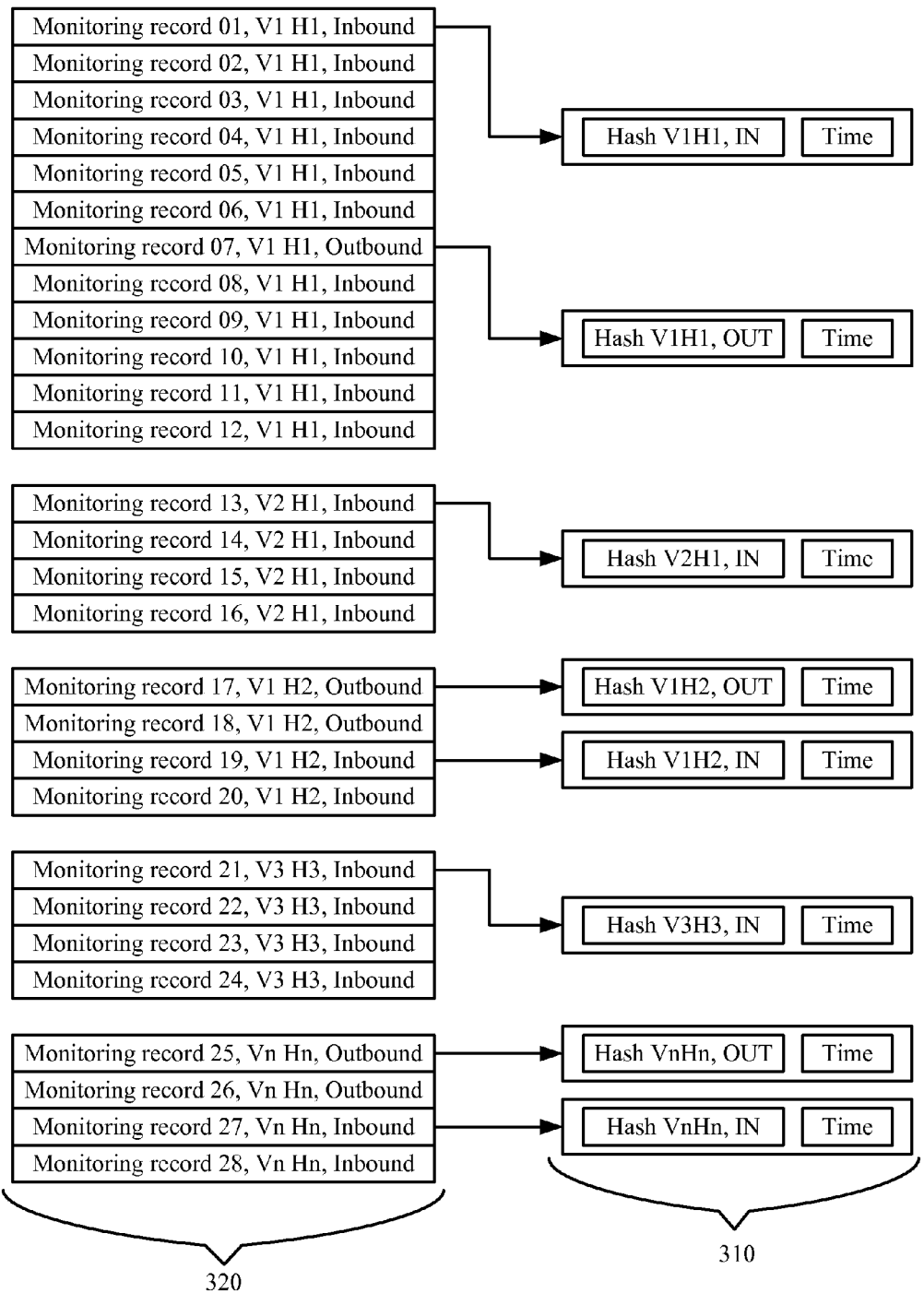
FIG. 3 is a diagram illustrating data in accordance with an embodiment of the present invention.

FIG. 3 is a block diagram depicting one embodiment of a topology index 310 corresponding to an application monitoring dataset 320 in accordance with an embodiment of the present invention. Application monitoring datasets may be much larger than the depicted example, but for simplicity and clarity the depicted dataset 320 has been limited to 28 monitoring records (shown on the left in FIG. 3). FIG. 3 depicts how a processing module may process the application monitoring data to produce a topology index comprising eight entries (shown on the right in FIG. 3). In the depicted embodiment, the entries in the topology index 310 have been hashed.

In the depicted embodiment, the processing module 180 receives application monitoring records 1-28 via data broker 170, and processes each record. In one embodiment, the processing module 180 identifies the two nodes a record corresponds to (indicated by Vn and Hn, where Vn and Hn refer to pieces of vertical data and horizontal data), as well as the activity direction (inbound or outbound from the instrumented node indicated by the vertical data Vn). The processing module 180 then determines whether or not an entry exists in the topology index corresponding to the entry of interest. If there is no existing entry, the processing module 180 creates an entry indicating the vertical data and horizontal data and the activity direction, as well as a timestamp indicating when the entry was created. If there is an existing entry, the processing module 180 does not create an additional entry, but instead updates the timestamp to indicate the time at which the new monitoring record was processed. The processing module 180 executes this operation on all of the monitoring records received, and the set of entries created by the process will be a topology index comprising only unique entries that can be processed to create a topology data structure corresponding to the application.

Figure 4:
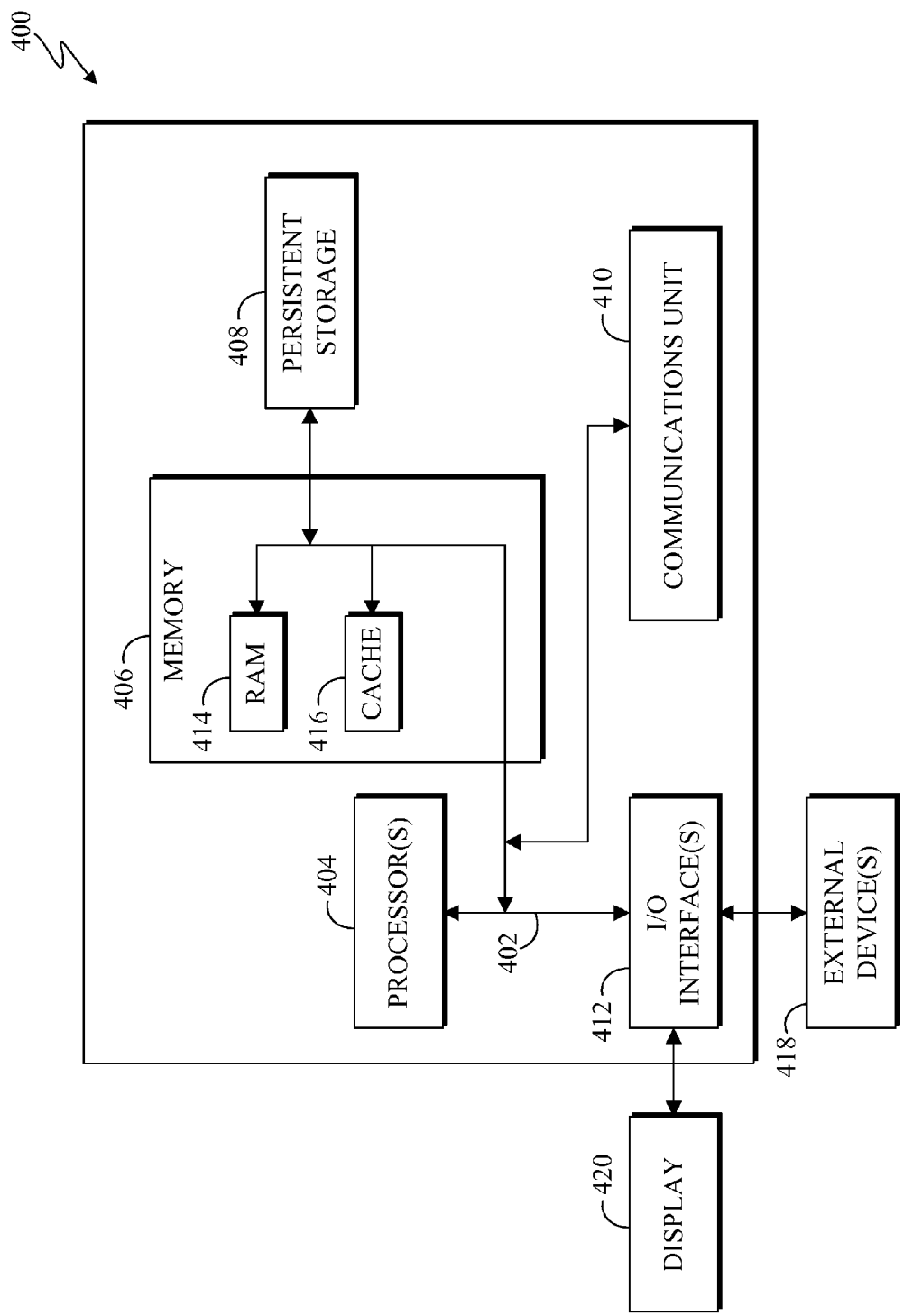
FIG. 4 is a block diagram depicting one example of a computing apparatus (i.e., computer) suitable for executing the methods disclosed herein.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provide.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
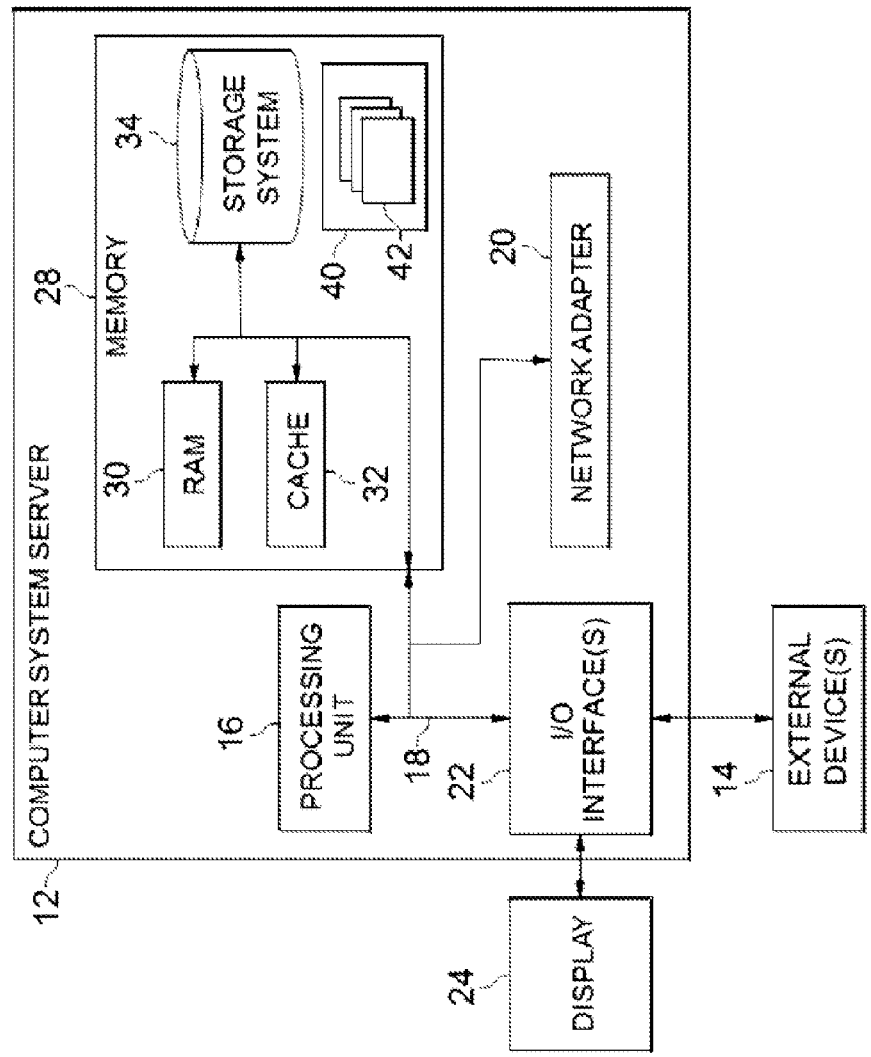
FIG. 5 depicts a cloud computing node according to an embodiments of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
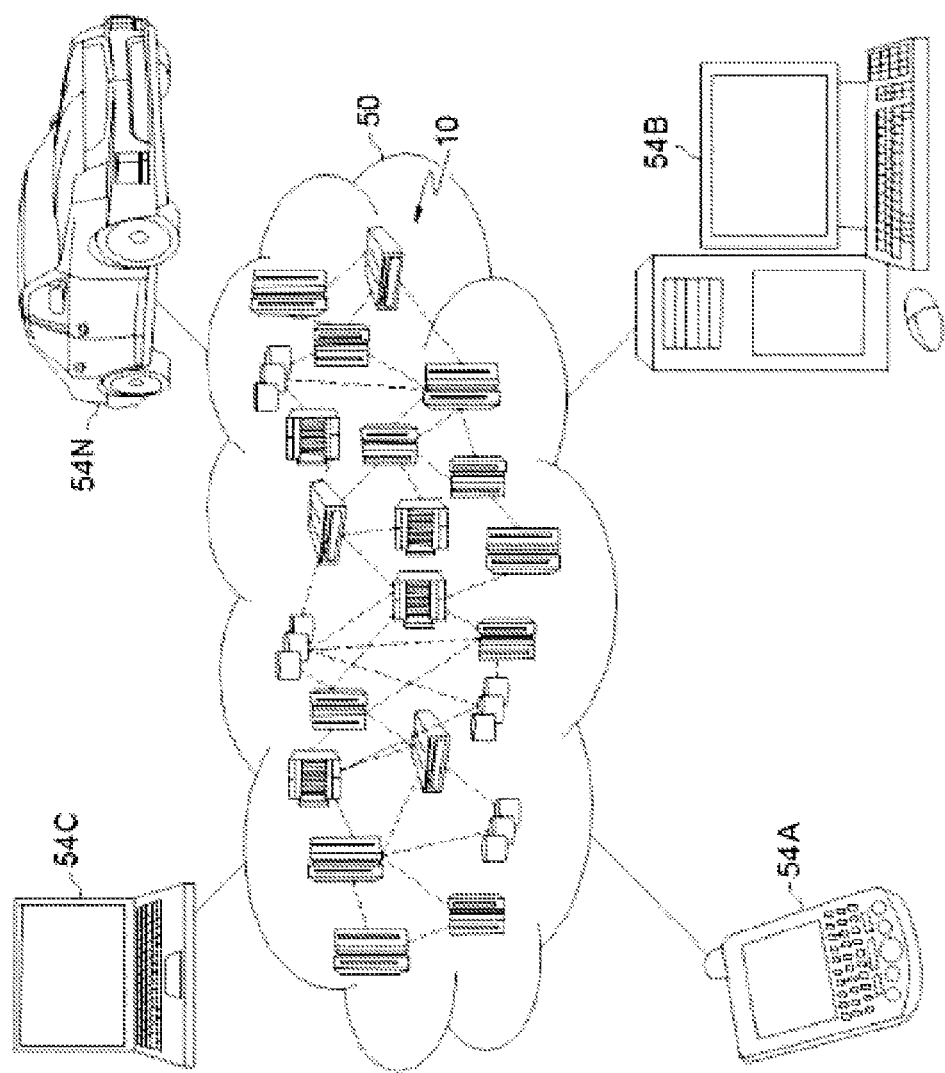
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
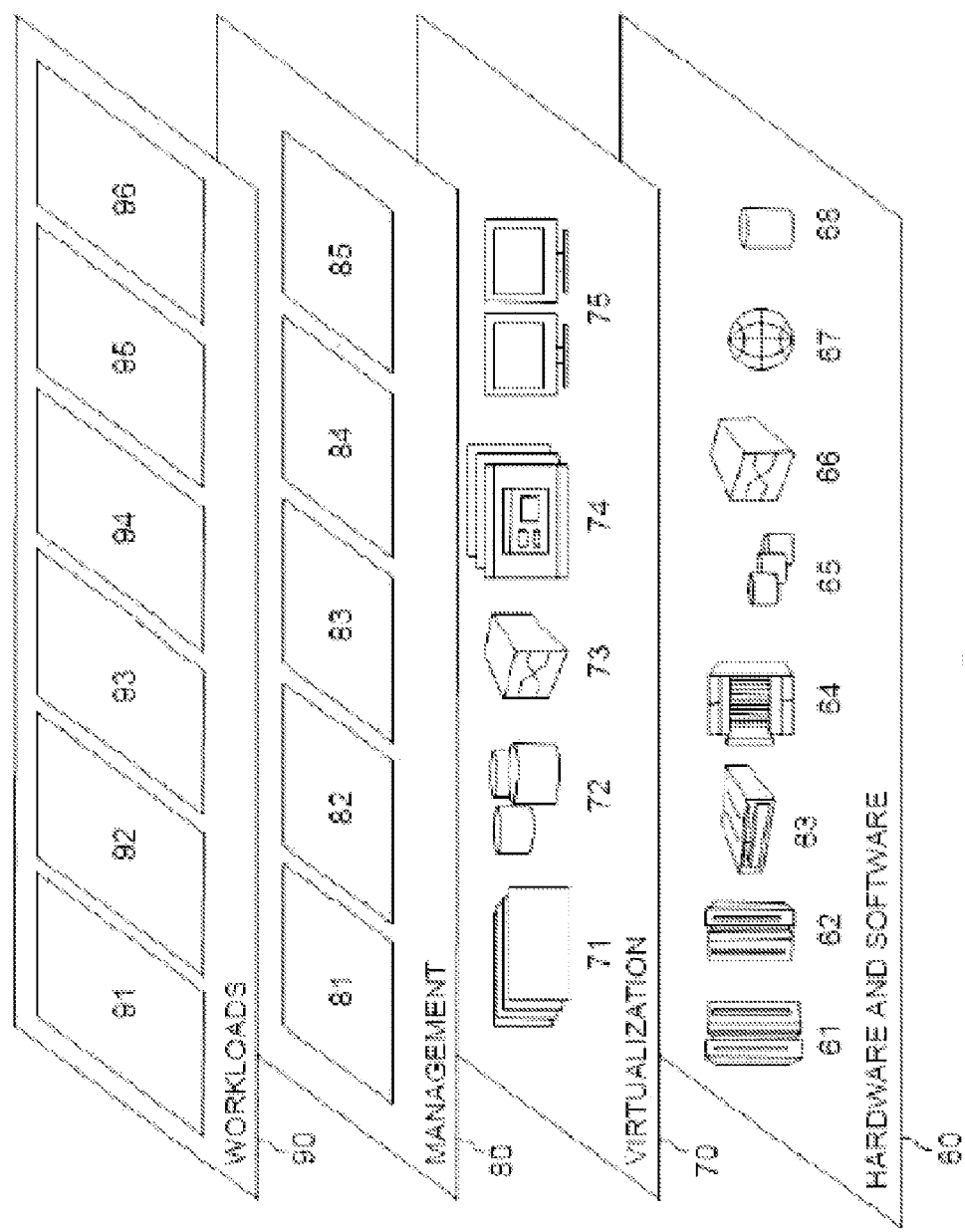
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96. Aspects of the present disclosure correspond to data analytics processing workload 94.

What is claimed is:

1. A method, executed by a computer, the method comprising:

performing an extract-transform-load operation on a set of application activity data to identify one or more node-to-node connections;

for each identified node-to-node connection, determining if an entry exists in a topology index corresponding to said identified node-to-node connection;

responsive to determining an entry does not exist in the topology index corresponding to said identified node-to-node connection, creating an entry in the topology index corresponding to the identified node-to-node connection to provide a topology index comprising a plurality of unique entries, wherein each of the unique entries corresponds to a node-to-node connection;

extracting node information and connection information for each entry in the topology index;

building an application topology data structure corresponding to the extracted node information and connection information; and displaying the application topology data structure to a user.

2. The method of claim 1, wherein the topology index is stored in a persistent data store.

3. The method of claim 1, wherein each entry in the topology index is stored as a light-weight document.

4. The method of claim 1, wherein each entry in the topology index includes a timestamp indicating a last time a monitoring record corresponding to the entry in the topology index was processed.

5. The method of claim 1, wherein the topology data structure, when built, corresponds to an application topology.

6. The method of claim 1, wherein each entry in the topology index is hashed.

7. The method of claim 1, wherein each entry in the topology index corresponds to an instrumented node, a non-instrumented node, and a connection between them.

8. An apparatus for processing data, the apparatus comprising:

a digital processing device configured to execute a plurality of program modules including:

a processing module configured to:

perform an extract-transform-load operation on a set of application activity data to identify one or more node-to-node connections;

determine, for each identified node-to-node connection, if an entry exists in a topology index corresponding to said identified node-to-node connection; and responsive to determining an entry does not exist in the topology index corresponding to said identified node-to-node connection, create an entry in the topology index corresponding to the identified node-to-node connection to provide a topology index comprising a plurality of unique entries, wherein each of the unique entries corresponds to a node-to-node connection;

an extraction module configured to extract node information and connection information for each entry in the topology index; and a topology calculator configured to:

build an application topology data structure corresponding to the extracted node information and connection information; and display the application topology data structure to a user.

9. The apparatus of claim 8, further comprising a persistent data store configured to store the topology index.

10. The apparatus of claim 8, wherein each entry in the topology index is stored as a light-weight document.

11. The apparatus of claim 8, wherein each entry in the topology index includes a timestamp indicating a last time a monitoring record corresponding to the entry in the topology index was processed.

12. The apparatus of claim 8, wherein the topology data structure, when built, corresponds to an application topology.

13. The apparatus of claim 8, wherein each entry in the topology index is hashed.

14. The apparatus of claim 8, wherein each entry in the topology index corresponds to an instrumented node, a non-instrumented node, and a connection between them.

15. A computer program product for processing data, the computer program product comprising:

one or more computer readable storage media and program instructions stored on the one or more computer readable storage media, the program instructions comprising instructions to:

perform an extract-transform-load operation on a set of application activity data to identify one or more node-to-node connections;

for each identified node-to-node connection, determining if an entry exists in a topology index corresponding to said identified node-to-node connection;

responsive to determining an entry does not exist in the topology index corresponding to said identified node-to-node connection, creating an entry in the topology index corresponding to the identified node-to-node connection to provide a topology index comprising a plurality of unique entries, wherein each of the unique entries corresponds to a node-to-node connection;

extract node information and connection information for each entry in the topology index;

build an application topology data structure corresponding to the extracted node information and connection information; and displaying the application topology data structure to a user.

16. The computer program product of claim 15, wherein the topology index is stored in a persistent data store.

17. The computer program product of claim 15, wherein each entry in the topology index is stored as a light-weight document.

18. The computer program product of claim 15, wherein each entry in the topology index includes a timestamp indicating a last time a monitoring record corresponding to the entry in the topology index was processed.

19. The computer program product of claim 15, wherein each entry in the topology index is hashed.

20. The computer program product of claim 15, wherein the topology data structure, when built, corresponds to an application topology.

* * * * *